(12) United States Patent
Van Beek et al.

(10) Patent No.: US 7,966,685 B2
(45) Date of Patent: Jun. 28, 2011

(54) POCKET RAMP

(75) Inventors: Ryan Van Beek, Sioux Center, IA (US); Joel Van Den Brink, Rock Valley, IA (US)

(73) Assignee: Link Manufacturing Ltd, Sioux Center, IA (US)

( * ) Notice: Subject to any disclaimer, the term of this patent is extended or adjusted under 35 U.S.C. 154(b) by 20 days.

(21) Appl. No.: 12/460,130

(22) Filed: Jul. 14, 2009

(65) Prior Publication Data

US 2011/0010872 A1    Jan. 20, 2011

(51) Int. Cl.
*E01D 1/00* (2006.01)
*B60P 1/00* (2006.01)

(52) U.S. Cl. .................................. 14/71.1; 414/537
(58) Field of Classification Search ............... 14/2.4, 14/69.5, 71.1
See application file for complete search history.

(56) References Cited

U.S. PATENT DOCUMENTS

| 4,900,217 | A | * | 2/1990 | Nelson | 414/537 |
| 4,941,703 | A | * | 7/1990 | Curry | 296/37.6 |
| 5,340,267 | A | * | 8/1994 | Stoll et al. | 414/537 |
| 5,795,125 | A | * | 8/1998 | Walkden | 414/537 |
| 5,803,523 | A | * | 9/1998 | Clark et al. | 296/26.1 |
| 5,897,285 | A | * | 4/1999 | Wanderscheid et al. | 414/537 |
| 6,431,815 | B1 | | 8/2002 | Zarzecki et al. | |
| 6,763,768 | B2 | * | 7/2004 | Hart et al. | 105/458 |
| 7,070,220 | B1 | * | 7/2006 | Lantaigne | 296/26.08 |
| 7,488,025 | B1 | * | 2/2009 | Roberson | 296/61 |
| 2008/0271266 | A1 | * | 11/2008 | Johnson | 14/71.1 |
| 2010/0115714 | A1 | * | 5/2010 | Cassway et al. | 14/71.3 |

* cited by examiner

*Primary Examiner* — Thomas B Will
*Assistant Examiner* — Abigail A Risic
(74) *Attorney, Agent, or Firm* — Dennis L. Thomte; Thomte Patent Law Office LLC (57) ABSTRACT

A pocket ramp for loading objects or cargo onto the floor of a vehicle and which is mounted between the longitudinally extending frame members of the vehicle. The pocket ramp assembly includes a main frame, a primary slide, a secondary slide, a lower ramp section, an upper ramp section and a latching mechanism which selectively locks the pocket ramp assembly in either of its stowed or operative positions. The main frame is fixed to the longitudinally extending frame members of the vehicle, the primary side being slidably mounted therein. The secondary slide is slidably mounted in the primary slide. The upper ramp section is pivotally mounted to the rearward end of the secondary slide and the lower ramp section is pivotally mounted to the rearward end of the upper ramp section.

1 Claim, 14 Drawing Sheets

180
POCKET RAMP

BACKGROUND OF THE INVENTION

1. Field of the Invention

This invention relates to a pocket ramp assembly for loading objects or cargo onto the floor of a vehicle such as a truck or the like. More particularly, this invention relates to a pocket ramp assembly which is mounted between the longitudinally extending frame members of a vehicle and which includes a main frame, a primary slide, a secondary slide, an upper ramp section and a lower ramp section. Even more particularly, this invention relates to a latching mechanism which selectively locks the pocket ramp assembly in either of its stowed or operative positions.

2. Description of the Related Art

Loading ramps have long been used at the rear of a vehicle such as a truck or the like to enable cargo or objects to be either loaded onto the floor of the vehicle or to unload objects or cargo from the vehicle. In many cases, the ramp is comprised of a single elongated ramp member with the forward end thereof being positioned at the rear of the floor of the vehicle and with the lower end thereof being placed on the ground rearwardly of the vehicle. In many cases, the ramp is stored or stowed beneath the floor of the vehicle when not being used.

In recent years, loading ramps have been constructed so as to be foldable and retractable. For example, see U.S. Pat. No. 6,431,815 which issued on Aug. 13, 2002 to Zarzecki, et al. The instant invention is believed to be an improvement over the prior art folding and retractable ramp assemblies in that it is extremely easy to stow the ramp assembly of this invention in a pocket which is created by a main frame positioned between the longitudinally extending frame members of the vehicle and which is easily moved between its stowed position to an operative or usable position. The instant invention is also believed to represent an improvement over the prior art in that "pinch" points are reduced and an improved locking or latching structure is provided to latch or lock the ramp assembly in its stowed position and in its operative, usable or extended position.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A pocket ramp assembly is described for loading objects or cargo onto the floor of a vehicle having a pair of longitudinally extending frame members with forward and rearward ends. The pocket ramp assembly of this invention includes a horizontally disposed main frame which is positioned between the pair of longitudinally extending frame members of the vehicle and which is secured thereto. The main frame includes first and second longitudinally, horizontally spaced-apart channel shaped main side rails, having forward and rearward ends, which are operatively secured to the frame members of the vehicle. A latch mechanism is pivotally mounted on the rearward end of the main frame at one side thereof which is selectively movable between locked and unlocked positions.

The pocket ramp assembly also includes a primary slide having first and second ends and horizontally spaced-apart side rails with forward and rearward ends. The primary slide is selectively slidably mounted in the main side rails of the main frame between a forward retracted position and a rearward extended position. The assembly also includes a secondary slide having forward and rearward ends. The secondary slide is selectively slidably mounted in the primary slide between a forward retracted position to a rearward extended position. The assembly also includes an upper ramp section having forward and rearward ends with the upper ramp section being selectively pivotally secured about a horizontal axis, intermediate its forward and rearward ends, to the rearward end of the secondary slide. The upper ramp section is selectively movable with respect to the secondary slide from a first position wherein the upper ramp section is generally parallel to the secondary slide to a second position wherein the upper ramp section is angularly disposed with respect to the secondary slide so that the forward end of the upper ramp section is positioned in a plane about its rearward end.

The assembly of this invention also includes a lower ramp section having first and second ends with the first end of the lower ramp section being pivotally secured, about a horizontal axis, to the rearward end of the upper ramp section. The lower ramp section is selectively movable from a first stowed position wherein it is positioned adjacent the upper ramp section and parallel thereto to a second extended position wherein it extends rearwardly from the upper ramp section.

The ramp assembly of this invention may be positioned in a stowed position between the frame members of the vehicle when the primary slide is in its forward retracted position, the secondary slide is in its forward retracted position, the lower ramp section is in its first stowed position, and the upper ramp section is in its first position.

The ramp assembly, when in its operative extended position, extends rearwardly from the rearward end of the vehicle frame members and the main frame when the primary slide is in its rearward extended position, the secondary slide is in its rearward extended position, the upper ramp section is in its second position, and the lower ramp section is in its second extended position. Each of the lower and upper ramp sections include horizontally spaced-apart side rails having a non-skid deck extending therebetween.

The latch mechanism, when in its unlocked position, permits the ramp assembly to be moved from the stowed position to the extended position. The latch assembly is selectively movable to lock the ramp assembly in its stowed position and in its extended position.

The forward end of the upper ramp section includes means for engaging the floor of the vehicle to prevent downward movement of the forward end of the upper ramp section when the upper ramp section is in its second position.

A flexible strap means extends between the forward end of the secondary slide to the forward end of the upper ramp section to limit the upward movement of the forward end of the lower ramp section with respect to the secondary slide. Preferably, a handle means is secured to the upper ramp section which extends upwardly therefrom when the upper ramp section is in its first stowed position.

It is therefore a principal object of the invention to provide an improved pocket ramp assembly.

A further object of the invention is to provide an improved pocket ramp assembly for loading objects or cargo onto the floor of a vehicle or unloading the objects or cargo from the vehicle.

A further object of the invention is to provide a pocket ramp assembly which is movable from a stowed position to an operative usable extended position.

A further object of the invention is to provide a pocket ramp assembly including a latching mechanism for locking the pocket ramp assembly in its stowed position and for locking the pocket ramp assembly in its operative extended position.

A further object of the invention is to provide a pocket ramp assembly which is easily movable between a stowed position and an extended usable position and vice versa.

Still another object of the invention is to provide a pocket ramp assembly which has a reduced number of "pinch" points thereon.

Still another object of the invention is to provide a pocket ramp assembly which is durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The pocket ramp assembly of this invention is referred to generally by the reference numeral 10 and is designed to be used with a vehicle such as a truck or the like having a pair of longitudinally extending frame rails 11 and 11' with rearward and forward ends. Pocket ramp assembly 10 generally includes a main frame 12, primary slide 14, secondary slide 16, an upper ramp section 18 and a lower ramp section 20.

Figure 1:
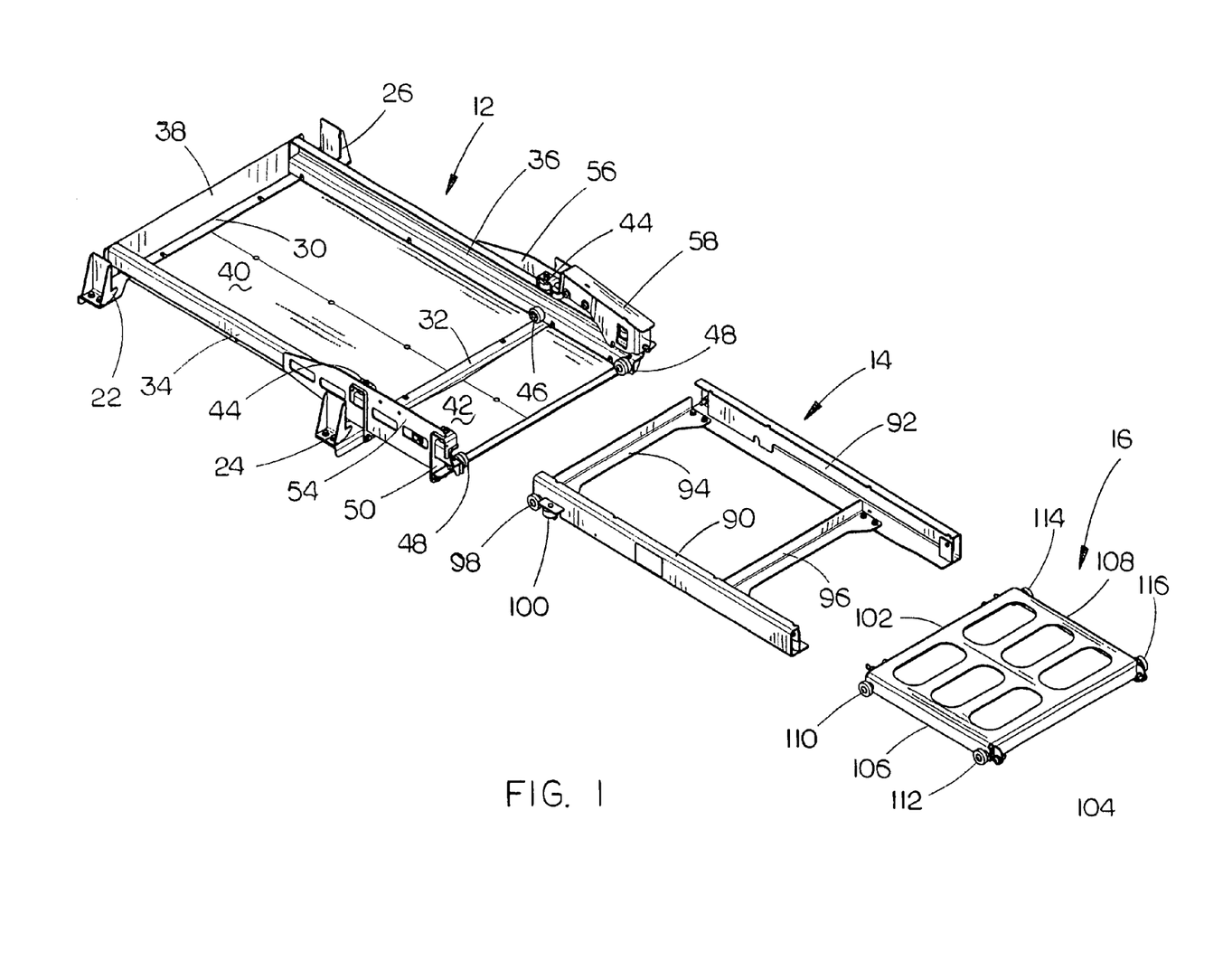
FIG. 1 an exploded rear perspective view of the main frame, primary slide and secondary slide of this invention.
Figure 2:
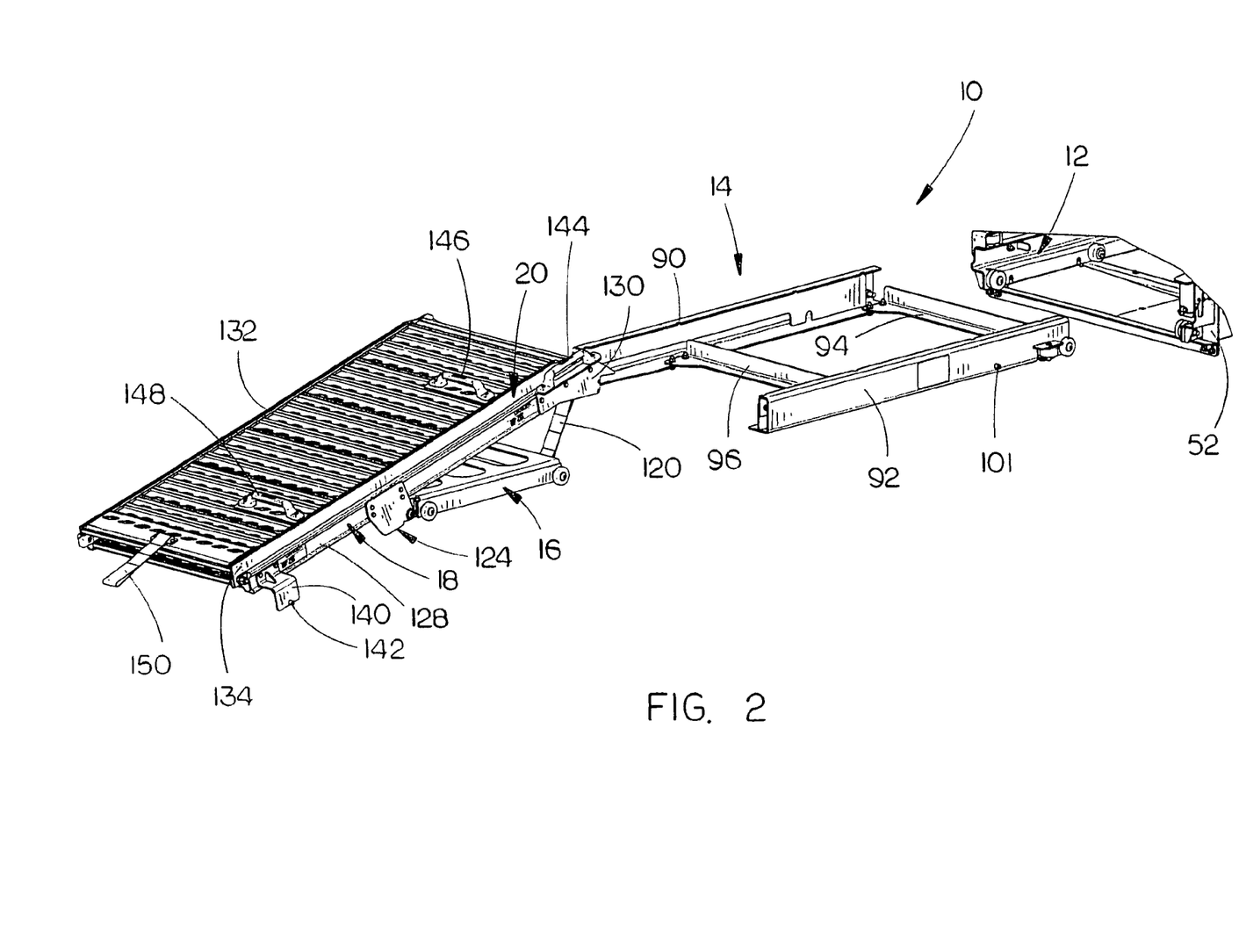
FIG. 2 is a partial rear exploded perspective view of the pocket ramp assembly of this invention.
Figure 3:
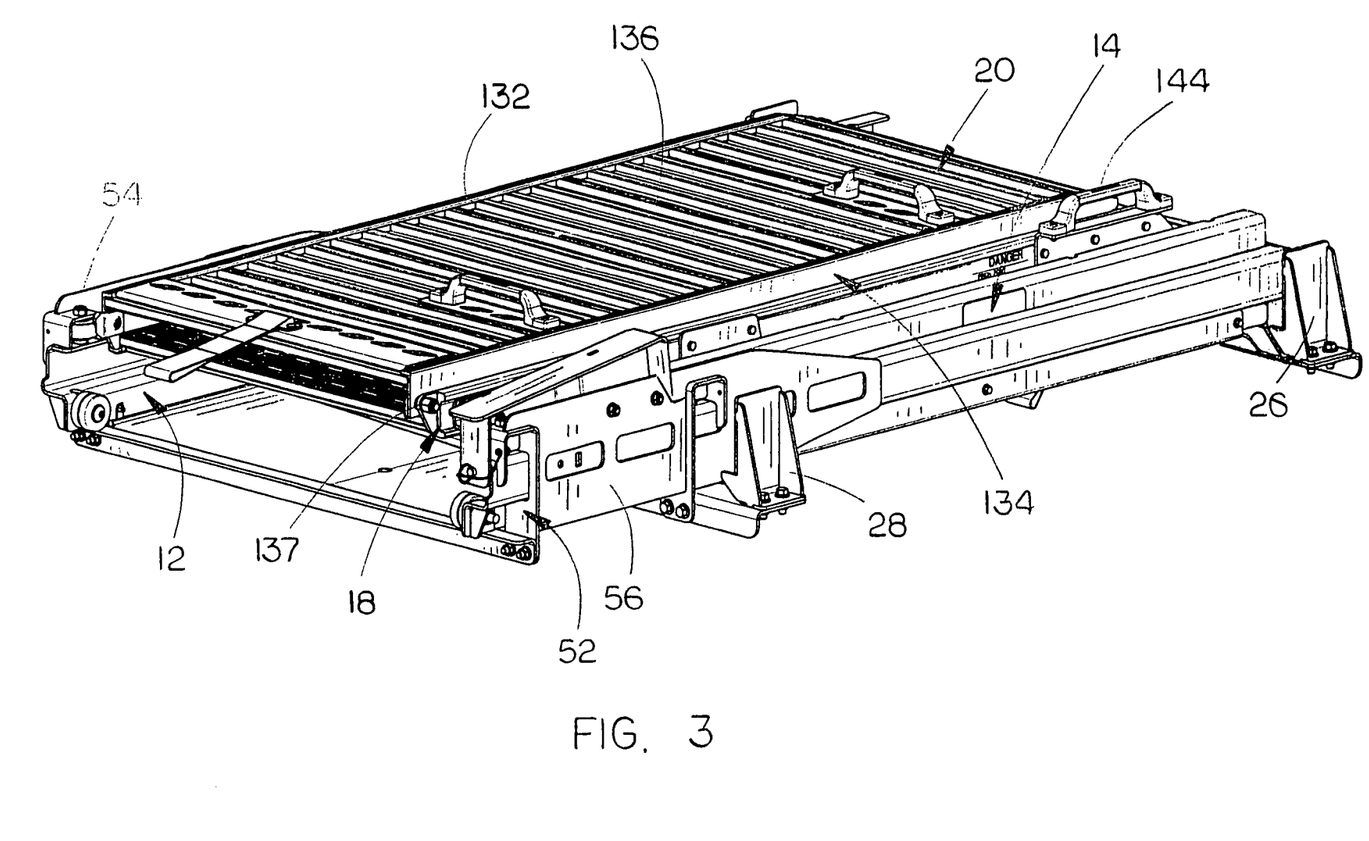
FIG. 3 is a rear perspective view of the pocket ramp assembly of this invention in its stowed position.
Figure 4:
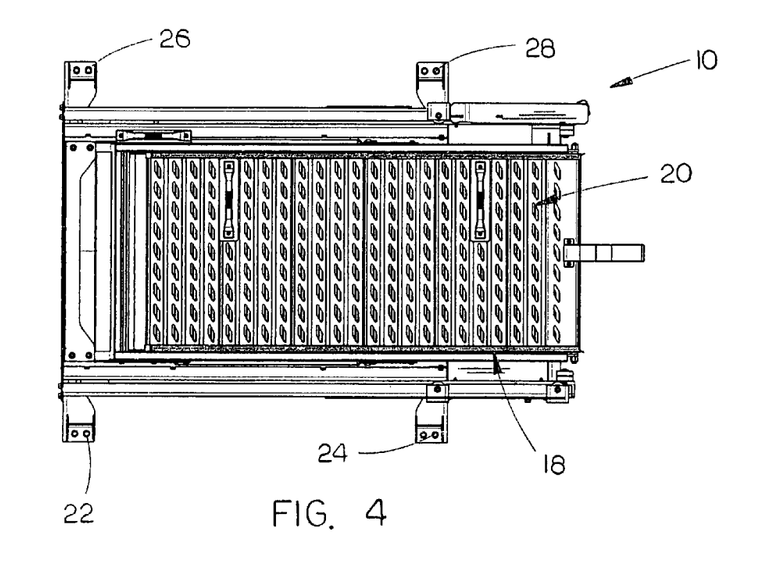
FIG. 4 is a top view of the stowed pocket ramp assembly of FIG. 3.
Figure 5:
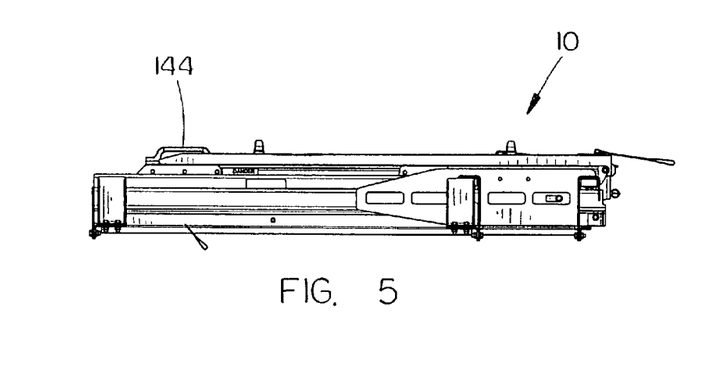
FIG. 5 is side view of the pocket ramp assembly of FIG. 3.
Figure 6:
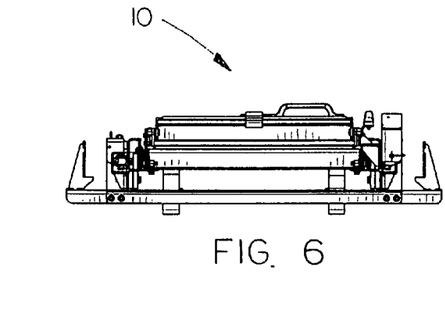
FIG. 6 is a rear view of the pocket ramp assembly of FIG. 3.
Figure 7:
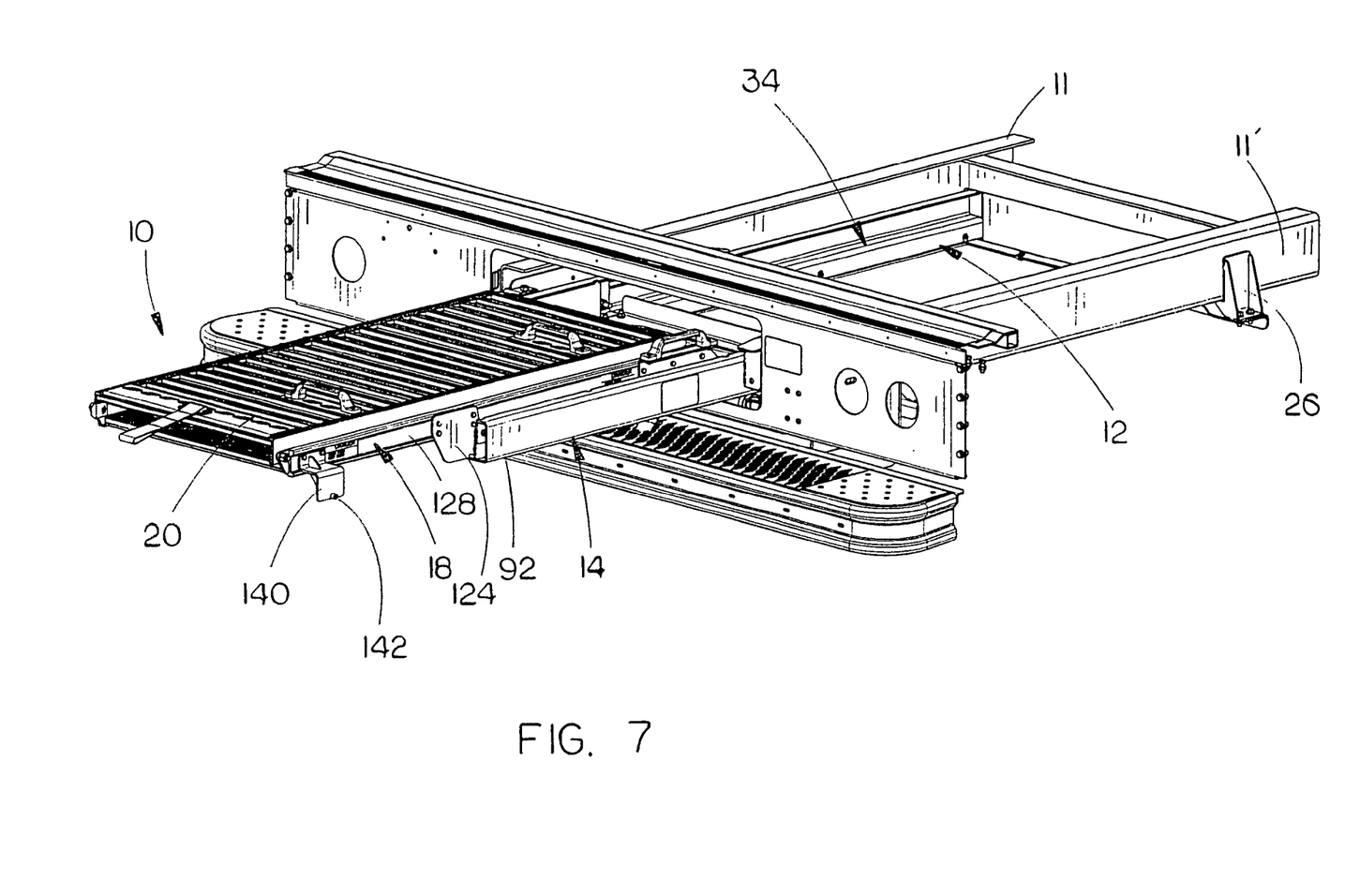
FIG. 7 is a rear perspective view illustrating the pocket ramp assembly being initially moved from its stowed position towards its operative extended position.
Figure 8:
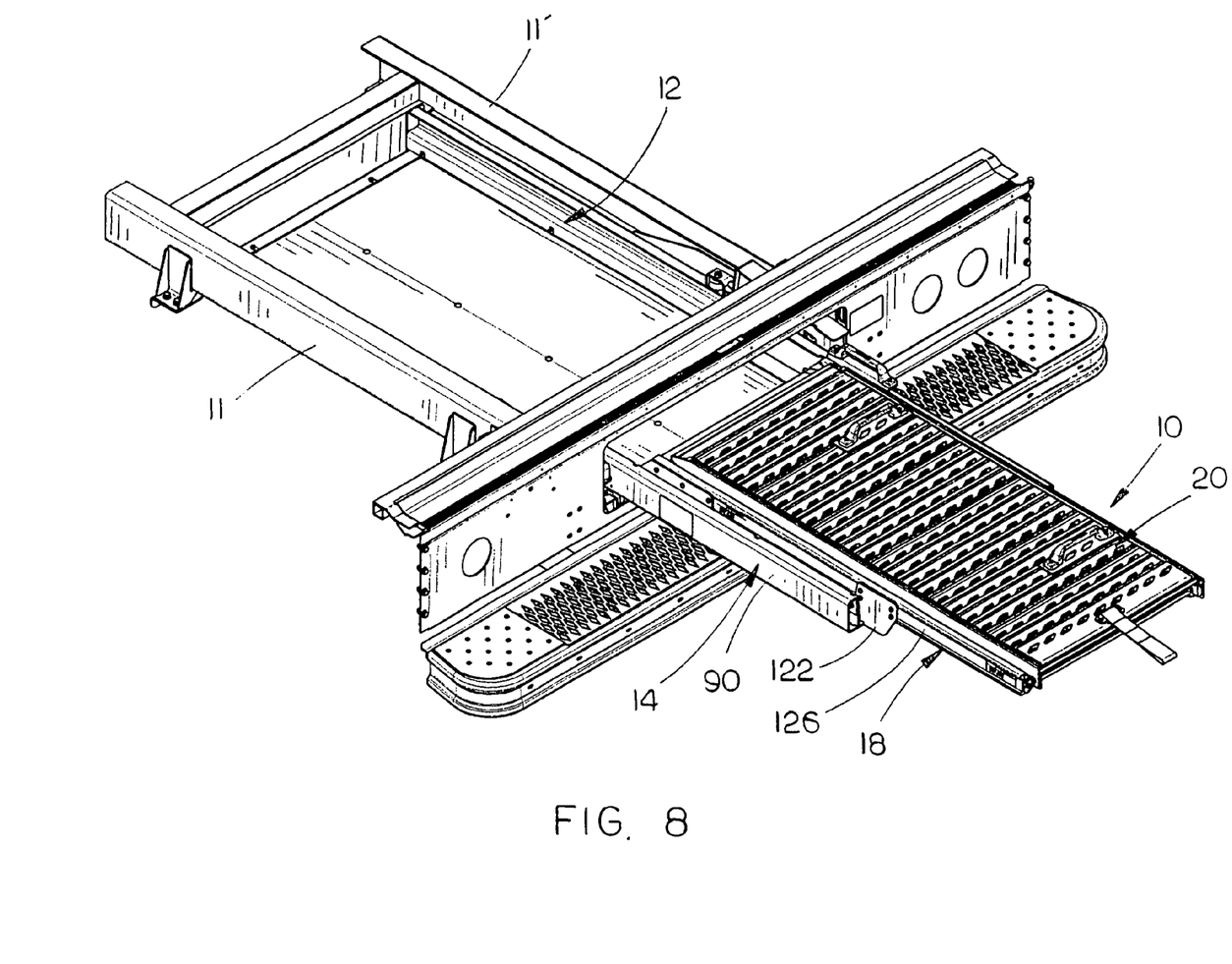
FIG. 8 is a rear perspective view of the pocket ramp assembly of this invention being initially moved from its stowed position towards its extended operative position.
Figure 9:
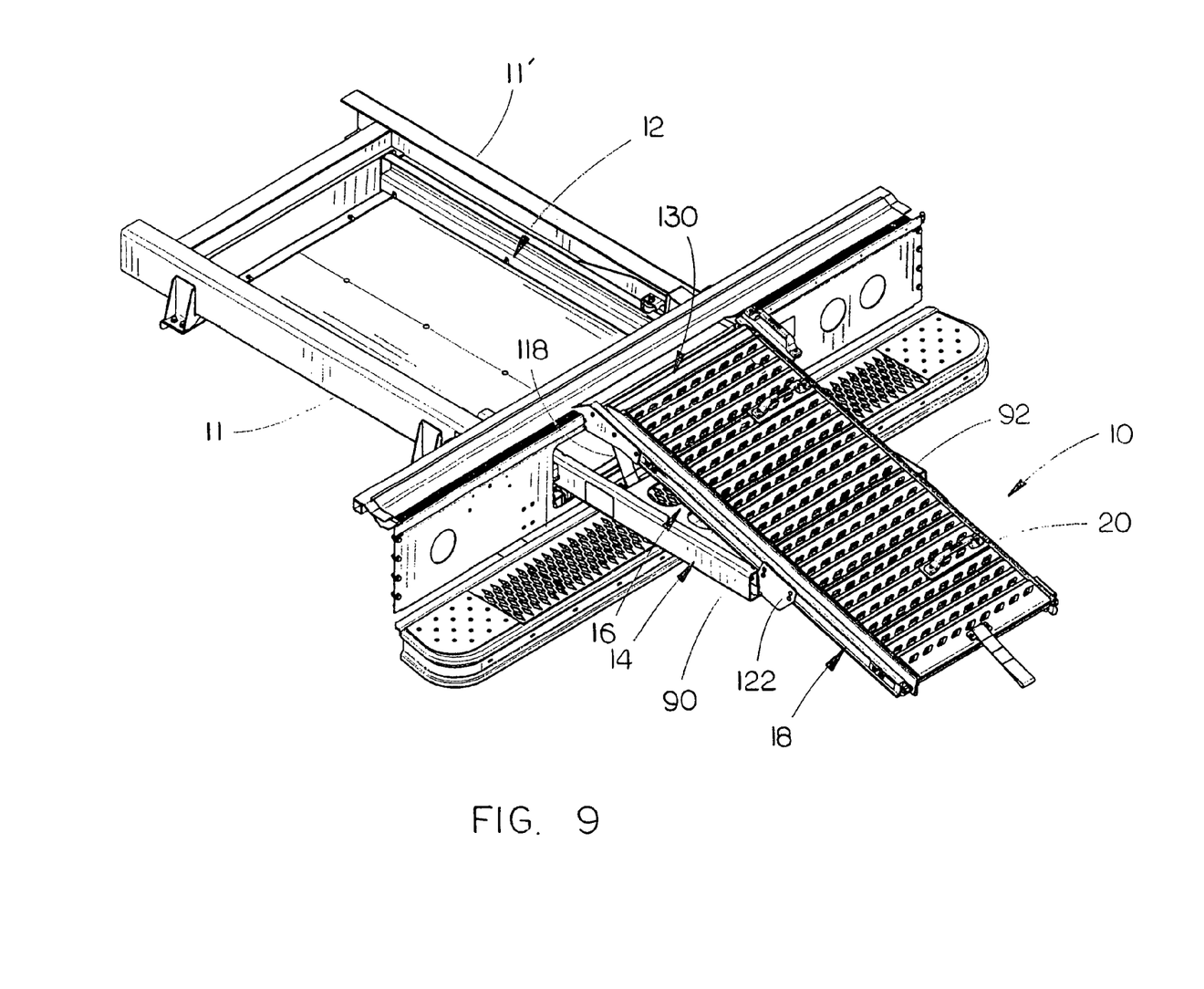
FIG. 9 is a rear perspective view illustrating the forward end of the upper ramp section being positioned on the rearward end of the vehicle floor during the movement of the pocket ramp assembly from its stowed position to its operative position.
Figure 10:
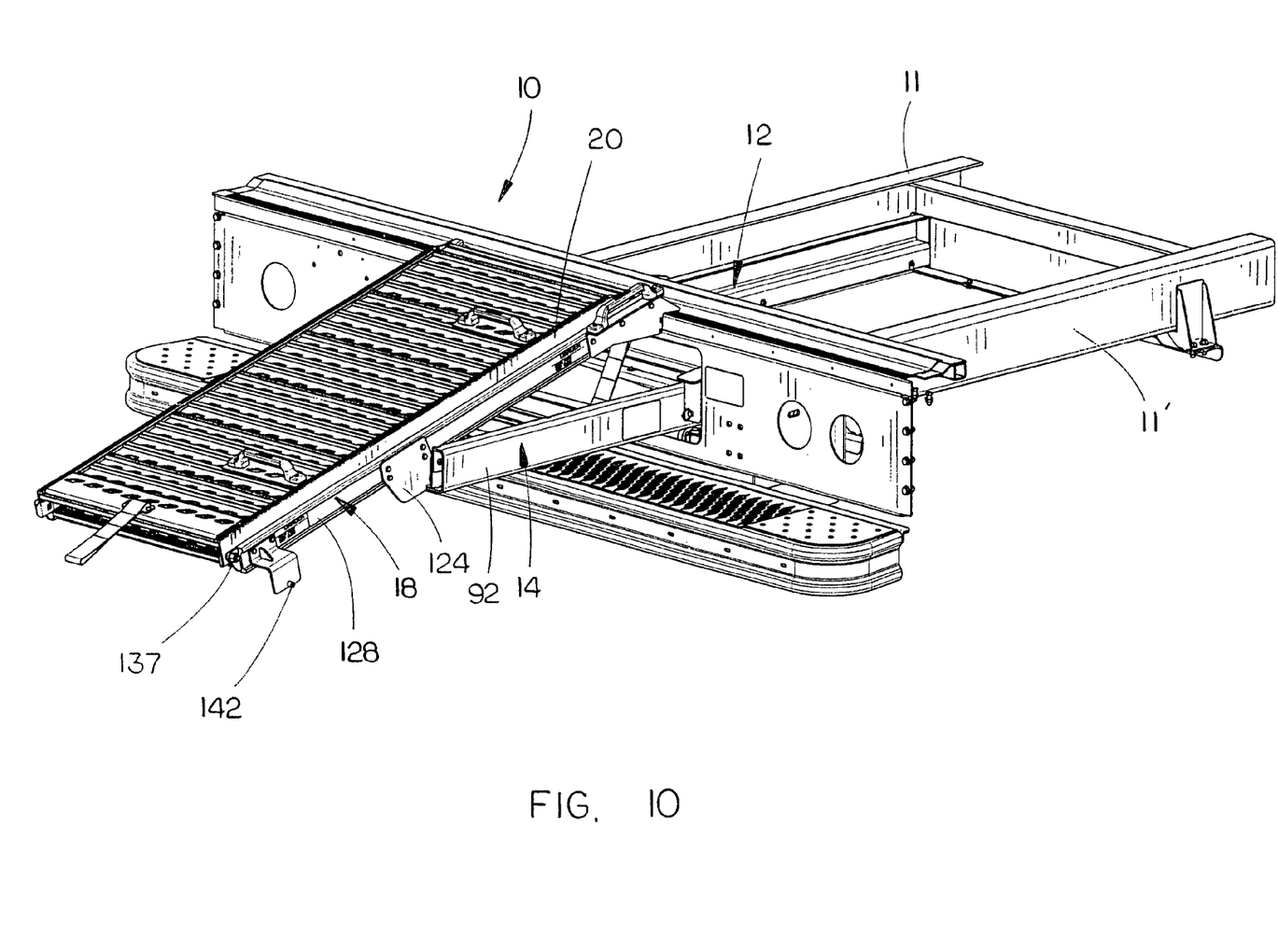
FIG. 10 is a rear perspective view as seen from the right side of FIG. 9.
Figure 11:
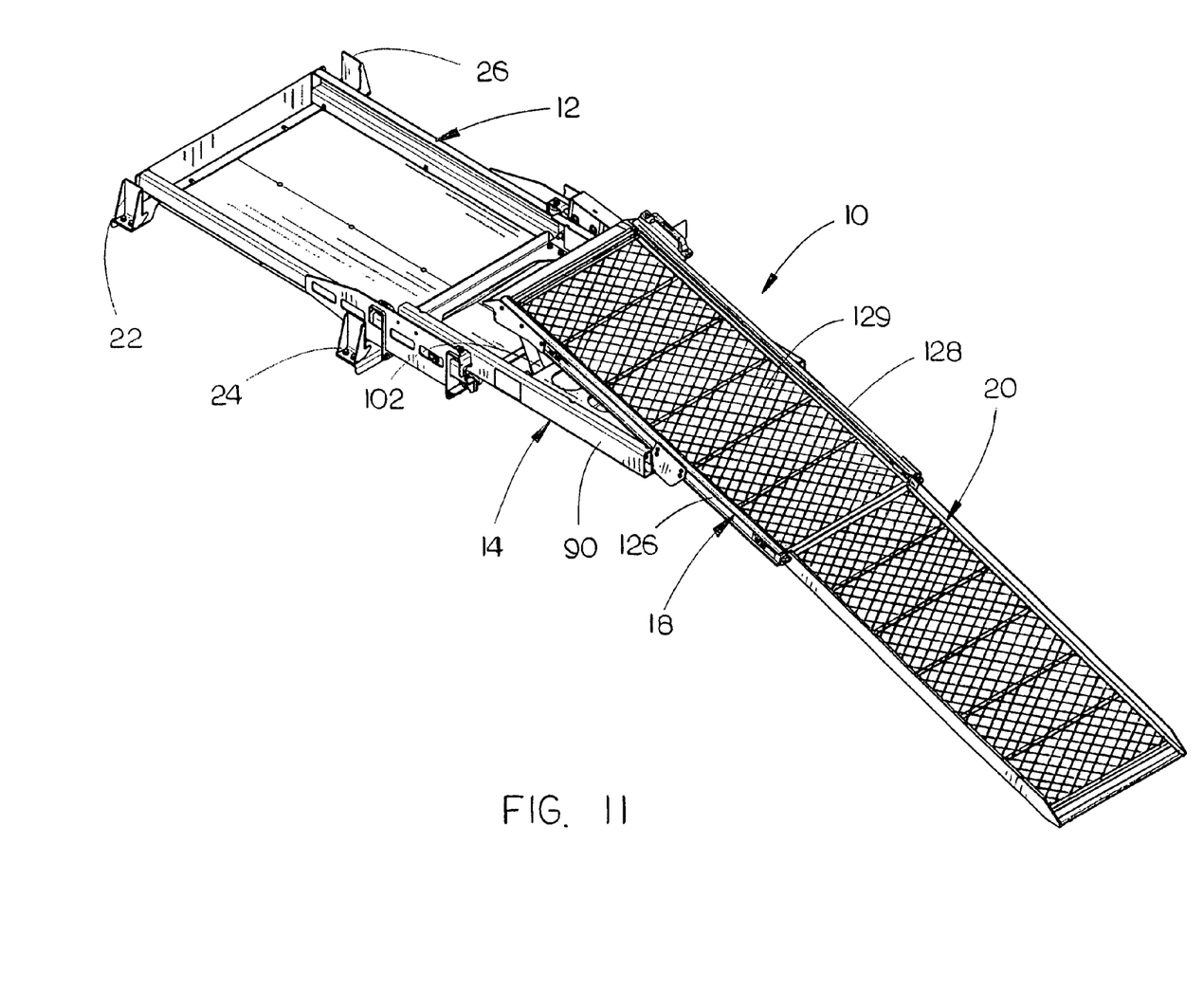
FIG. 11 is a rear perspective view of the pocket ramp assembly of this invention in its extended operative position.
Figure 12:
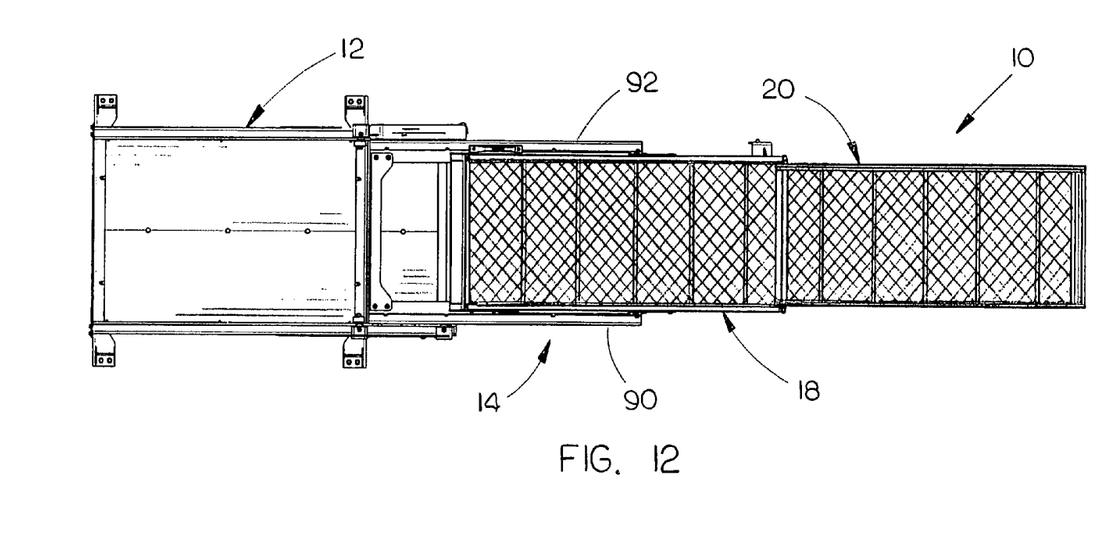
FIG. 12 is a top view of the pocket ramp assembly in its extended operative position.
Figure 13:
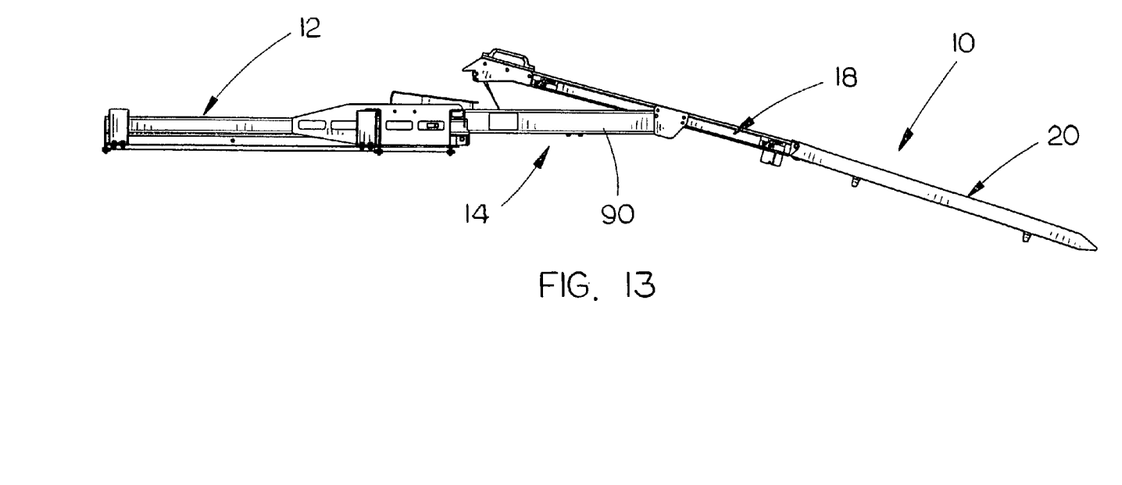
FIG. 13 is a side view of the pocket ramp assembly in its extended operative position.
Figure 14:
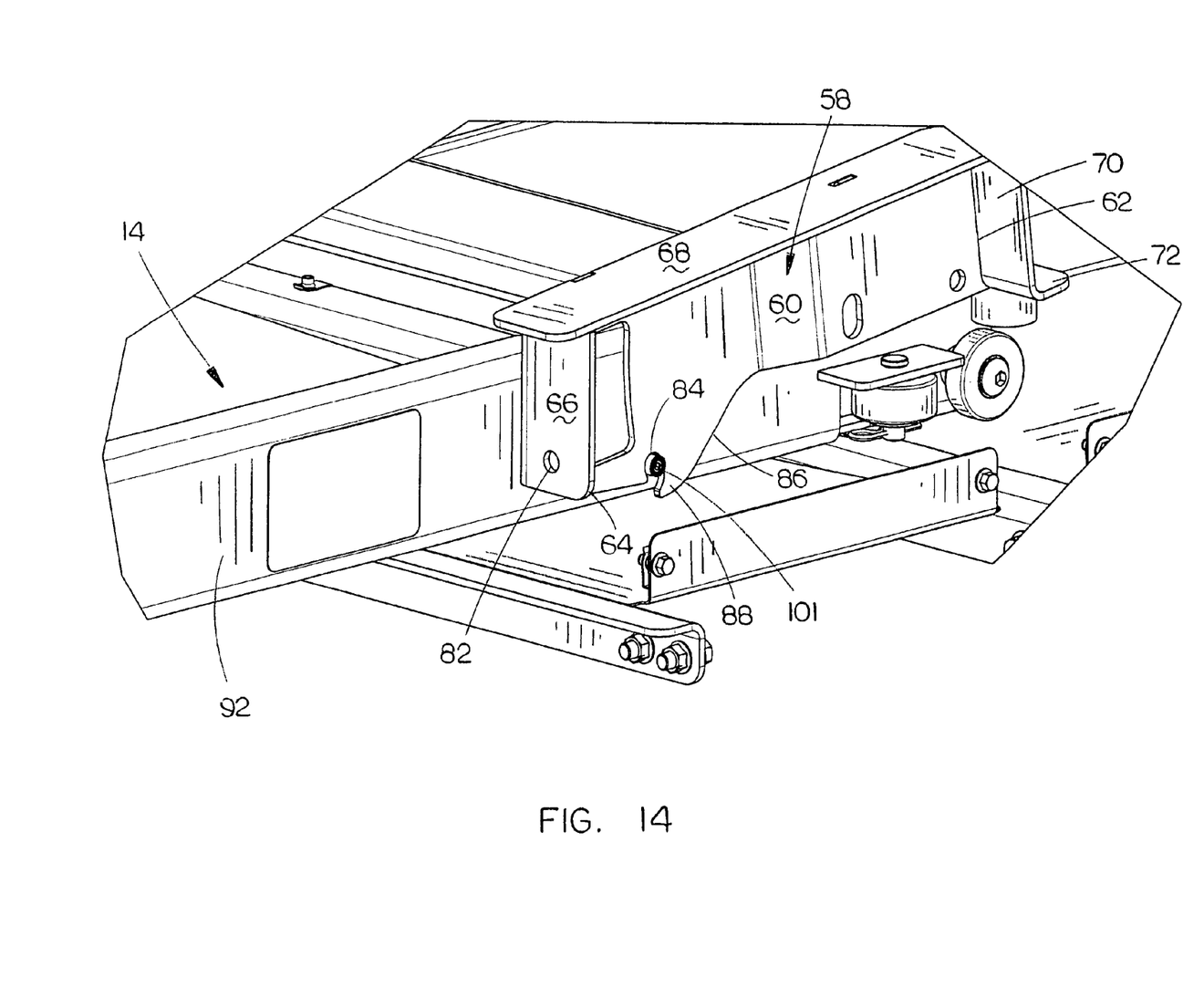
FIG. 14 is a partial perspective view illustrating the latch mechanism of this invention in its locked position to maintain the pocket ramp assembly in its extended operative position with portions thereof cut-away to more fully illustrate the invention.
Figure 15:
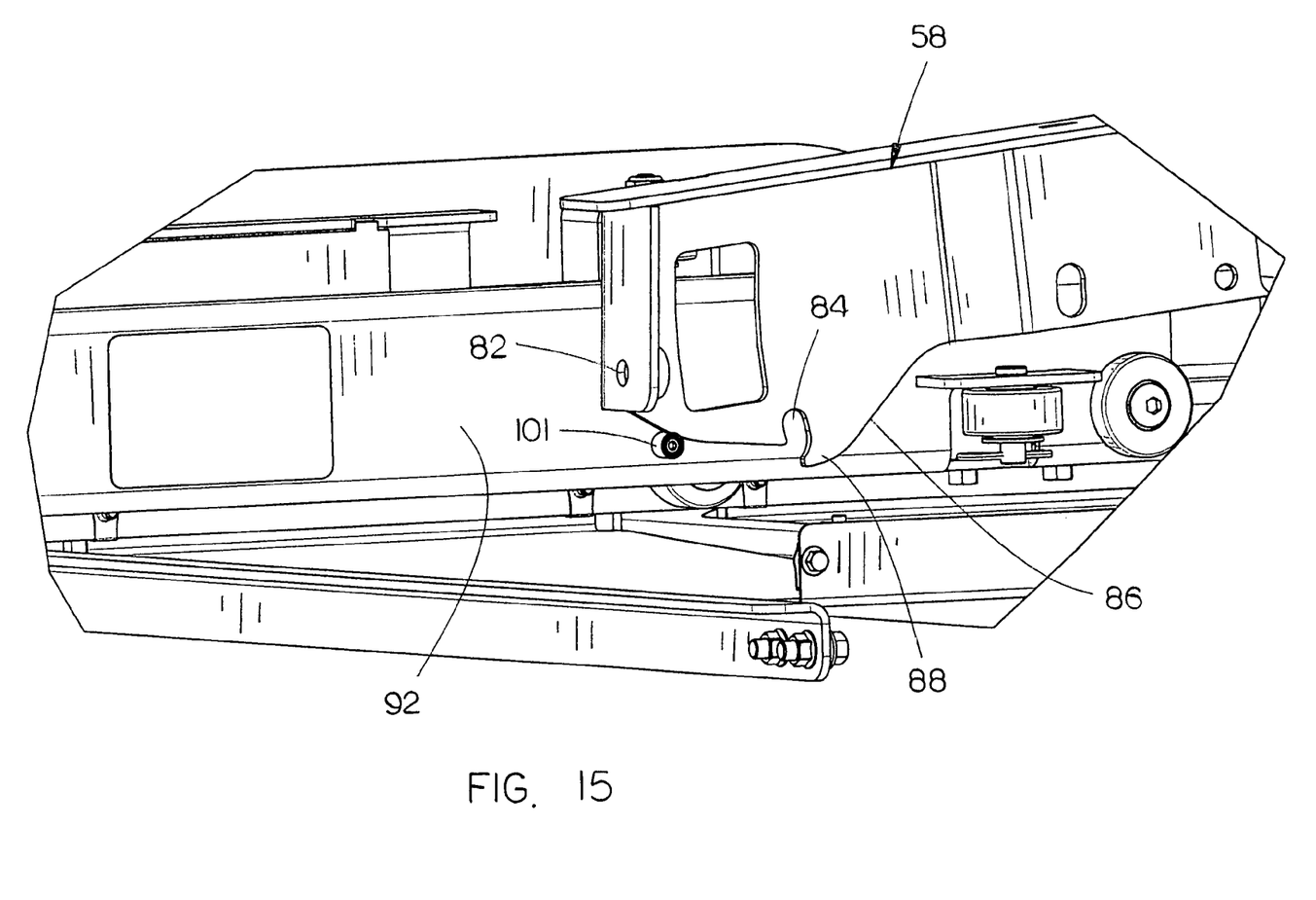
FIG. 15 is a partial rear perspective view of the pocket ramp assembly of this invention illustrating the latching mechanism with the upper ramp section being in its fully extended position prior to the forward end thereof being attached to the floor of the vehicle.
Figure 16:
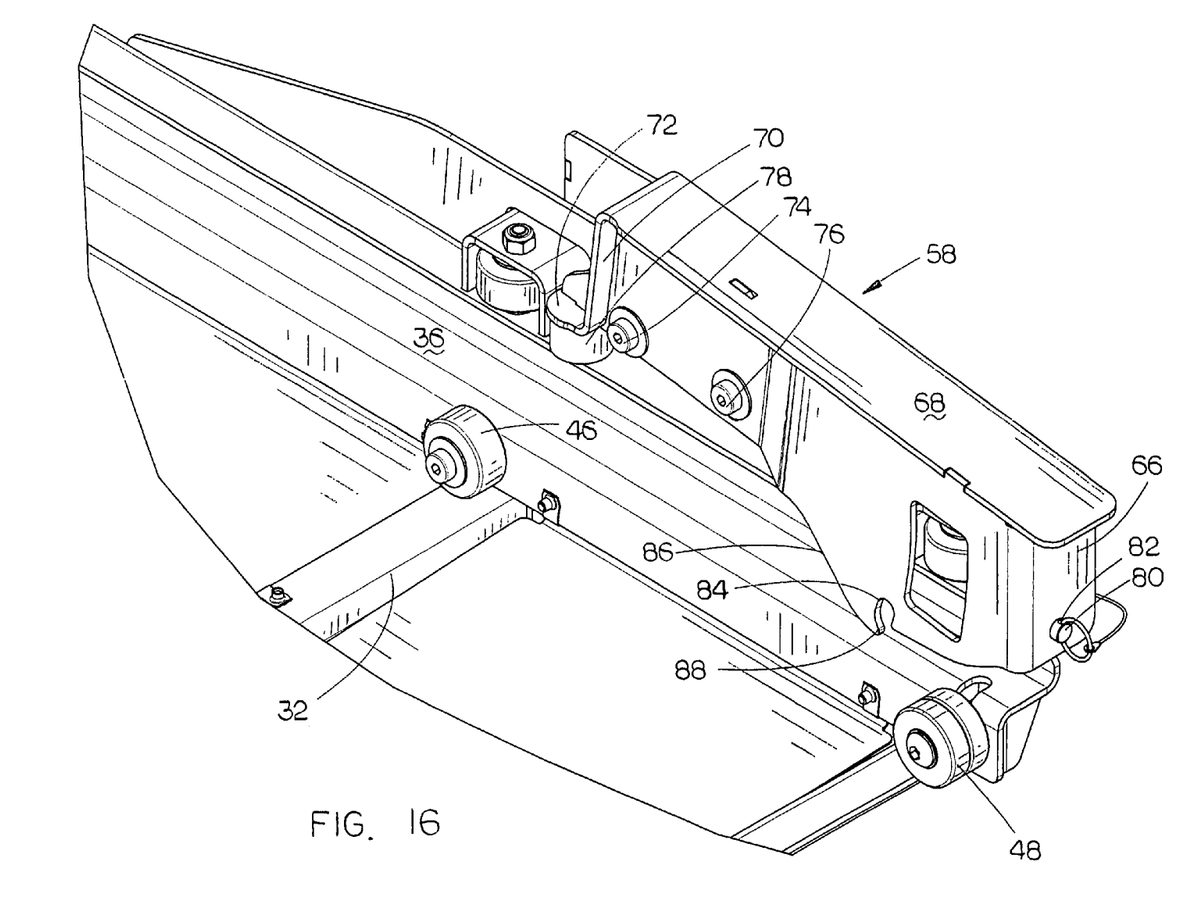
FIG. 16 is a partial rear perspective view of the latch assembly in its locked position with portions thereof cut-away to more fully illustrate the invention.
Figure 17:
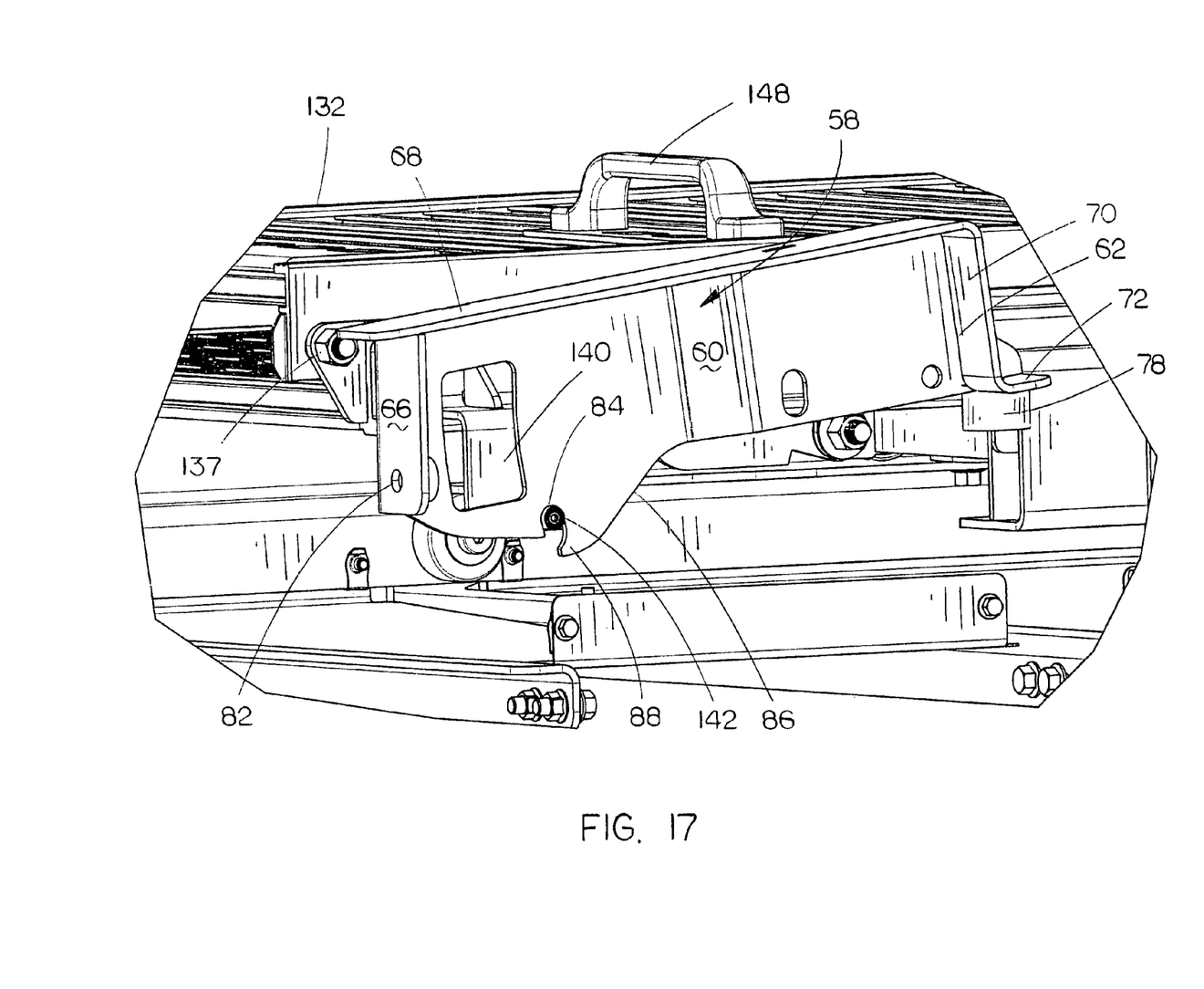
FIG. 17 is a partial rear perspective view of the latch assembly in its locked position when the ramp assembly is in its stowed position with portions thereof curt-away to more fully illustrate the invention.

Main frame 12 includes frame brackets 22, 24, 26 and 28 which are attached to the frame rails of the vehicle chassis. A cross member 30 is secured to and extends between frame brackets 22 and 26. A cross member 32 is secured to and extends between frame brackets 24 and 28. A main side rail 34 is secured to cross members 30 and 32 and extends therebetween and a main side rail 36 is secured to cross members 30 and 32 and extends therebetween as seen in FIG. 1. An elongated, vertically disposed debris shield 38 is secured to and extends between the forward ends of main side rails 34 and 36. Debris shields 40 and 42 are secured to main side rails 34 and 36 and extend therebetween as seen in FIG. 1.

The main side rails 34 and 36 have lateral rollers 44 mounted thereon which face inwardly therefrom. Each of the main side rails 34 and 36 have a roller 46 secured thereto forwardly of the rearward ends thereof which is rotatable about a horizontal axis for supporting the primary slide 14 when it is in its stored position. Each of the main side rails 34 and 36 have a roller 48 secured thereto at the rearward end thereof which is rotatable about a horizontal axis for supporting the primary slide when it is in its extended or deployed position. A plate or bracket 50 is welded to the rearward end of main side rail 34 and which is shaped to permit the rearward end of main side rail 34 to extend therethrough. A plate or bracket 52 is welded to the rearward end of main side rail 36 to extend therethrough. The numerals 54 and 56 refer to plate members which are part of the main side rails 34 and 36 respectively and which are positioned at the outer sides of main side rails 34 and 36 respectively. The rearward ends of plates 54 and 56 are welded to the brackets 50 and 52 respectively.

The numeral 58 refers to a latch assembly which includes an angled side wall 60 having a forward end 62 and a rearward end 64. Latch assembly 58 also includes a back wall 66 which extends laterally outwardly from side wall 60. Latch assembly 58 further includes a top wall 68, front wall 70 and a forwardly extending foot portion 72. Latch assembly 58 is pivotally secured to the plate 56 by a latch pivot pin 74 so as to be positioned at the inner side of main side rail 36. A slotted latch guide 76 is provided on side wall 60 rearwardly of latch pivot pin 74. A compression bumper 78 is positioned between the underside of foot portion 72 and the upper end of main side rail 36 so as to yieldably urge the forward end of latch assembly 58 upwardly and the rearwardly end of latch assembly 58 downwardly. In its normal position, safety pin 80 extends forwardly inwardly through opening 82 formed in back wall 66 to interface with the top flange of the main side rail 36 to lock latching assembly 58 against pivotal movement. As seen, the lower end of side wall 60 is provided with an opening 84 formed therein which extends upwardly thereinto. As also seen, the lower edge of side wall 60 is provided with a rearwardly and downwardly sloped portion 86 which terminates in a "hook" portion 88 adjacent opening 84.

Primary slide 14 includes longitudinally extending side rails 90 and 92 having cross members 94 and 96 extending therebetween. Slide 14 also includes roller 98 secured to the outer forward side of rail 90 which is rotatable about a horizontal axis. Rail 90 also has a roller 100 secured to the forward end thereof which is rotatable about a vertical axis. Rollers identical to rollers 98 and 100 are secured to the forward end of rail 92. Primary slide 14 is movably positioned within side rails 34 and 36 of main frame 12 preferably approximately 52 inches so as to be movable in and out with respect to the main frame 12 with the rollers on the main frame and on the primary slide guiding the movement. Side rail 92 has a pin 101 secured thereto which extends laterally therefrom.

Secondary slide 16 is slidably movably mounted in primary slide 14 for approximately 9 inches. Slide 16 includes a forward end 102, rearward end 104, and sides 106 and 108. Rollers 110 and 112 are mounted on slide 16 at side 106 about horizontal axes. Rollers 114 and 116 are mounted on slide 16 at side 108 about horizontal axes. Straps 118 and 120 are secured to the forward end 102 of slide 16 for a purpose to be described hereinafter.

A pair of horizontally spaced-apart ramp pivot brackets 122 and 124 are pivotally secured at their lower ends, about horizontal axes, to the rearward end of slide 16.

Upper ramp section 18 includes a pair of side rails 126 and 128 having non-skid or non-slip decking members 129 secured thereto and extending therebetween. The upper ends of ramp pivot brackets 122 and 124 are bolted to the side rails 126 and 128 respectively to enable upper ramp section 18 to be pivotally secured, about a horizontal axis, to secondary slide 16.

The forward end of upper ramp section 18 is provided with a top ramp approach structure 130 which extends forwardly therefrom. The upper ends of straps 118 and 120 are secured to the forward end of upper ramp section 18.

Lower ramp section 20 includes a pair of side rails 132 and 134 having non-skid or non-slip decking members 136 secured thereto and extending therebetween. The forward end of lower ramp section 20 is pivotally secured, about a horizontal axis at 137, to the rearward end of upper ramp section 18 at 138. The lower ramp section 20 has a width slightly less than the width of upper ramp section 18 so that it may nest within the upper ramp section 18 when folded. Bracket 140 extends outwardly and downwardly from side rail 128 at the rearward end thereof and has a pin 142 extending therefrom. A handle 144 is secured to the upper forward end of upper ramp section 18 at one side thereof. Handles 146 and 148 are secured to the underside of lower ramp section 20. Strap 150 is secured to the underside of lower ramp section adjacent the forward end thereof.

Assuming that the ramp assembly of this invention is in its stowed position with pin 80 inserted into opening 82 to lock the ramp assembly in its stowed position with the pin 142 being received in opening 84 of the latching assembly 58, the ramp is locked in its stowed position. If it is desired to use the ramp, pin 80 is removed from opening 82 so that the rearward end of the latch assembly 58 may be raised to disengage the pin 142 from the opening 84. The strap 150 is then grasped and the ramp assembly other than main frame 12 is then slid outwardly. Once the mechanism has been slid slightly outwardly, the latch assembly 58 will be allowed to pivotally move so that the rearward end of the latch assembly is moved downwardly by means of the compression member 78. The ramp assembly, other than main frame 12, is then slidably moved rearwardly with respect to the main frame 12 until it hits a stop which prevents further outward movement of the primary slide 14, secondary slide 16, lower ramp section 18 and upper ramp section 20. The pin 101 on the primary slide will have slidably moved rearwardly beyond the locking point (opening 84) of the latch at this time. The rearward ends of the ramp sections 18 and 20 are then pushed downwardly to tilt the forward end of the upper ramp section 18 as far as the straps 118 and 120 will permit. The mechanism is then pushed forwardly until the latch falls in place over the pin 101 on the primary slide 14. The top lip of the ramp or the approach structure 130 will now be resting on the rear edge of the vehicle floor or body. The latch assembly 58 prevents the system from moving rearward while in its extend usable position. The safety pin 80 is then replaced. The lower ramp section 20 is then pivotally moved with respect to the upper ramp section 18 so that the lower ramp section 20 is in its extended position. The ramp assembly may then be used.

When it is desired to stow the ramp assembly, lower ramp section 20 is folded upwardly onto the upper surface of the upper ramp section 18. The safety pin 80 is then removed. The rearward end of the latch assembly 58 is then raised and the mechanism is slidably moved rearwardly so that the forward end of the approach structure 130 may be disengaged from the floor of the vehicle. At that point, the forward end of the upper ramp section 18 is pivotally moved downwardly to a horizontal position. The lower ramp section 120 is then folded onto the upper ramp section 118 if not already done so. The rearward end of the latching assembly 58 is then raised and the mechanism is slid inwardly or forwardly. Once the pin 101 is beyond the locking point of the latching assembly 58, the latching assembly 58 may be allowed to go back down. The mechanism is slid inwardly until the latch falls in place over the pin 142 on the side of the upper ramp section 18. The safety pin 80 is then replaced. The ramp assembly 10 is then in its locked, stowed position Thus it can be seen that a novel pocket ramp assembly has been provided which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A pocket ramp assembly for loading objects onto a floor of a vehicle having a pair of longitudinally extending frame members having forward and rearward ends comprising:
   a horizontally disposed main frame positioned between the pair of longitudinally extending frame members of the vehicle and secured thereto;
   said main frame including first and second longitudinally extending, horizontally spaced-apart main side rails having forward and rearward ends operatively secured to the frame members of the vehicle;
   a primary slide, having a forward end, a rearward end, horizontally spaced-apart first and second side rails with forward and rearward ends and inner and outer sides;

said primary slide being selectively slidably mounted in said main frame between a forward retracted position and a rearward extended position;

a secondary slide having a forward end, a rearward end, a first side and a second side;

said secondary slide being selectively slidably mounted in said primary slide between a forward retracted position to a rearward extended position;

an upper ramp section having a forward end, a rearward end, a first side and a second side;

said upper ramp section being selectively pivotally secured, about a horizontal axis, intermediate its forward and rearward ends, to said rearward end of said secondary slide;

said upper ramp section being selectively movable with respect to said secondary slide from a first position wherein said upper ramp section is generally parallel to said secondary slide, to a second position wherein said upper ramp section is angularly disposed with respect to said secondary slide so that said forward end of said upper ramp section is positioned in a plane above said rearward end thereof;

a lower ramp section having a first end, a second end, a first side and a second side;

said first end of said lower ramp section being pivotally secured, about a to horizontal axis, to said rearward end of said upper ramp section;

said lower ramp section being selectively movable from a first stowed position wherein it is positioned adjacent said upper ramp section and parallel thereto to a second extended position wherein it extends rearwardly from said upper ramp section;

the pocket ramp assembly being capable of being positioned in a stowed position between the frame members of the vehicle when said primary slide is in its said forward retracted position, said secondary slide is in its said forward retracted position, said upper ramp section is in its said first position and said lower ramp section is in its said first stowed position;

the pocket ramp assembly being in an operative extended position extending rearwardly from the rearward end of the vehicle frame members and said main frame when said primary slide is in its said rearward extended position, said secondary slide is in its said rearward extended position, said upper ramp section is in its said second position and said lower ramp section is in its said second extended position;

a latch assembly having a forward end, a rearward end, an upper end and a lower end;

said latch assembly being pivotally secured, about a transverse horizontal axis, rearwardly of said forward end thereof, to said second main side rail at said rearward end thereof;

said latch assembly being movable between a locked position and an unlocked position;

said rearward end of said latch assembly, when said latch assembly is in said locked position, being positioned in a first lower position;

said rearward end of said latch assembly, when said latch assembly is in said locked position, being positioned in a second upper position;

a first lock pin selectively removably extending forwardly through said rearward end of said latching assembly so as to interface with said second main side rail to maintain said latching assembly in said locked position;

said lower end of said latching assembly having an elongated opening formed therein which extends upwardly thereinto;

said lower end of said latching assembly having a rearwardly facing hook portion which is positioned adjacent the lower forward end of said first elongated opening;

a second lock pin extending transversely horizontally outwardly from said second main side rail rearwardly of said forward end thereof adapted to be received by said first elongated opening in said lower end of said latching assembly when said primary slide is in said extended position to lock said primary slide in said extended position when said first lock pin is interfacing with said second main side rail;

said second side of said upper ramp section having a third lock pin extending transversely horizontally outwardly therefrom;

said third lock pin adapted to be received by said first elongated opening in said lower end of said latching assembly when said primary slide and said secondary slide are in their said retracted positions, to lock said primary slide and said secondary slide in said retracted positions when said first lock pin is interfacing with said second main side rail.

\* \* \* \* \*